(12) United States Patent
Humble (10) Patent No.: US 7,321,855 B2
(45) Date of Patent: Jan. 22, 2008

(54) METHOD FOR QUANTIFYING PSYCHOLOGICAL STRESS LEVELS USING VOICE PATTERN SAMPLES

(76) Inventor: Charles Humble, 11400 Fortune Cir., West Palm Beach, FL (US) 33414

( * ) Notice: Subject to any disclaimer, the term of this patent is extended or adjusted under 35 U.S.C. 154(b) by 833 days.

(21) Appl. No.: 10/737,530

(22) Filed: Dec. 15, 2003

(65) Prior Publication Data
US 2005/0131692 A1 Jun. 16, 2005

(51) Int. Cl.
G10L 21/00 (2006.01)
G10L 11/00 (2006.01)

(52) U.S. Cl. ............................. 704/270; 704/273
(58) Field of Classification Search ................ 704/273
See application file for complete search history.

(56) References Cited
U.S. PATENT DOCUMENTS
3,971,034 A * 7/1976 Bell et al. ................ 346/33 R
6,427,137 B2 * 7/2002 Petrushin ................... 704/273
7,165,033 B1 * 1/2007 Liberman ................... 704/270
7,191,134 B2 * 3/2007 Nunally ..................... 704/270

\* cited by examiner

Primary Examiner—Samuel G Neway
(74) Attorney, Agent, or Firm—McHale & Slavin, P.A.

(57) ABSTRACT

A computer-implemented method of assigning a numeric score to a voice pattern sample of a human subject wherein the score is indicative of the psychological stress level of the human subject. A verbal utterance of a human subject is converted into electrical signals to provide a subject wave pattern. The pattern is quantified and compared with known voice pattern characteristics which exhibit a sequential progression in the degree of blocking in the pattern, wherein each of the known voice patterns is assigned a numerical value range. A numerical value obtained from iterative calculations is assigned to the subject wave pattern based on the comparison. The numerical value represents the degree of blocking present in the subject wave pattern which correlates to the amount of psychological stress exhibited by the human subject.

19 Claims, 11 Drawing Sheets

*FIG. 1B* LYING

*FIG. 1A* TRUTHFUL

| Max Point Array | | Min Point Array | |
|---|---|---|---|
| [0] | {x=47 y=329} | [0] | {x=0 y=0} |
| [1] | {x=60 y=319} | [1] | {x=53 y=303} |
| [2] | {x=169 y=409} | [2] | {x=131 y=117} |
| [3] | {x=183 y=435} | [3] | {x=174 y=372} |
| [4] | {x=193 y=448} | [4] | {x=187 y=418} |
| [5] | {x=207 y=424} | [5] | {x=200 y=407} |
| [6] | {x=217 y=387} | [6] | {x=213 y=383} |
| . | | . | |
| . | | . | |
| . | | . | |
| [110] | {x=2158 y=123} | [111] | {x=2187 y=83} |
| [111] | {x=2191 y=84} | [112] | {x=2199 y=78} |
| [112] | {x=2205 y=85} | [113] | {x=2210 y=82} |
| [113] | {x=2234 y=115} | [114] | {x=2236 y=112} |
| [114] | {x=2242 y=116} | [115] | {x=2251 y=112} |
| [115] | {x=2294 y=215} | [116] | {x=2307 y=0} |

Table 1.

| Max Point Array | | Min Point Array | |
|---|---|---|---|
| [0] | {x=47 y=329} | [0] | {x=0 y=0} |
| [1] | {x=193 y=448} | [1] | {x=131 y=117} |
| [2] | {x=335 y=556} | [2] | {x=262 y=215} |
| [3] | {x=479 y=661} | [3] | {x=409 y=284} |
| [4] | {x=623 y=825} | [4] | {x=560 y=329} |
| [5] | {x=804 y=1078} | [5] | {x=716 y=451} |
| [6] | {x=947 y=1115} | [6] | {x=862 y=605} |
| [7] | {x=1093 y=1007} | [7] | {x=1005 y=669} |
| [8] | {x=1214 y=1066} | [8] | {x=1149 y=613} |
| [9] | {x=1347 y=1296} | [9] | {x=1286 y=557} |
| [10] | {x=1484 y=1195} | [10] | {x=1409 y=777} |
| [11] | {x=1695 y=638} | [11] | {x=1644 y=296} |
| [12] | {x=1886 y=203} | [12] | {x=1850 y=124} |
| | | [13] | {x=1964 y=56} |

Table 2.

*FIG 10a*

| Max Point Array | | Min Point Array | |
|---|---|---|---|
| [0] | {x=47 y=329} | [0] | {x=0 y=0} |
| [1] | {x=193 y=448} | [1] | {x=131 y=117} |
| [2] | {x=335 y=556} | [2] | {x=262 y=215} |
| [3] | {x=479 y=661} | [3] | {x=409 y=284} |
| [4] | {x=623 y=825} | [4] | {x=560 y=329} |
| [5] | {x=804 y=1078} | [5] | {x=716 y=451} |
| [6] | {x=947 y=1115} | [6] | {x=862 y=605} |
| [7] | {x=1093 y=1007} | [7] | {x=1005 y=669} |
| [8] | {x=1214 y=1066} | [8] | {x=1149 y=613} |
| [9] | {x=1347 y=1296} | [9] | {x=1286 y=557} |
| [10] | {x=1484 y=1195} | [10] | {x=1409 y=777} |
| | | [11] | {x=1644 y=296} |

Table 3.

| Mid-Point Array | | | |
|---|---|---|---|
| [0] | {x=23 y=170} | [11] | {x=833 y=829} |
| [1] | {x=89 y=217} | [12] | {x=904 y=831} |
| [2] | {x=162 y=274} | [13] | {x=976 y=835} |
| [3] | {x=227 y=325} | [14] | {x=1049 y=835} |
| [4] | {x=298 y=376} | [15] | {x=1121 y=835} |
| [5] | {x=372 y=413} | [16] | {x=1181 y=835} |
| [6] | {x=444 y=463} | [17] | {x=1250 y=835} |
| [7] | {x=519 y=486} | [18] | {x=1316 y=890} |
| [8] | {x=591 y=564} | [19] | {x=1378 y=978} |
| [9] | {x=669 y=628} | [20] | {x=1446 y=978} |
| [10] | {x=760 y=748} | [21] | {x=1505 y=978} |

Table 4.

*FIG. 10b*

METHOD FOR QUANTIFYING PSYCHOLOGICAL STRESS LEVELS USING VOICE PATTERN SAMPLES

FIELD OF THE INVENTION

This invention is related to the field of computer voice stress analysis, and more particularly to a method of generating a numerical score for a voice pattern which is indicative of the psychological stress level of the subject.

BACKGROUND OF THE INVENTION

Lie detection devices, i.e. devices which measure psychological stress as an indicator of deception, are commonly used in the fields of law enforcement and the military, and occasionally in the private sector. The oldest type of lie detection device, known as the polygraph, measures changes in a person's body associated with the stress of deception, including alterations in heart rate, breathing, and electrodermal activity. In a polygraph examination, the subject is required to be "wired" to the examination equipment in order to record the various physiological changes. Present day polygraph devices are now computer implemented. However, the basic technology has changed very little.

Later advances in the field of lie detection technology have focused on the detection of stress in human speech in an attempt to produce a portable lie detection device which could be used "in the field." Voice stress detection devices provide an advantage over the traditional polygraph in that they do not require that the subject be "wired," and are thus a non-invasive means of truth detection.

The scientific basis was provided by the discovery of vocal chord micro-tremors in the 1950's. In 1971, Olof Lippold, a researcher at University College, London, published the results of research he had begun in 1957 in the magazine *Scientific American*. Lippold's article, entitled "Physiological Tremor," explored the initial discovery by Martin Halliday and Joe Redfeam of the phenomena a decade previously at the National Hospital in London. Halliday and Redfeam discovered that the contraction of a voluntary muscle is accompanied by tremors of the muscle in the form of minute oscillations. According to Lippold, all muscles in the body, including the vocal chords, vibrate in the 8 to 12 Hz range. Lippold explained that the tremor is believed to be a function of the signals to and from motor neurons and that it is analogous to a self-adjusting closed-loop servo system, and that muscles tighten and loosen as they seek to maintain a constant tension. In moments of stress, the body prepares for fight or flight by increasing the readiness of its muscles to spring into action. Their vibration increases from the relaxed 8 to 9 Hz to the stressful 11 to 12 Hz range. A method of detecting psychological stress by evaluating physiological changes in the human voice is disclosed in U.S. Pat. No. 3,971,034 issued to Bell, the contents of which are herein incorporated by reference.

Voice stress patterns were first introduced as a method of measuring psychological stress beginning with the Psychological Stress Evaluator designed by W. H. Ford, A. D. Bell, and C. R McQuiston in 1971. The instrument, the PSE, recorded tracings on a strip chart utilizing EKG paper and a heated stylus. Each response produced movements of the stylus that made vertical lines on the paper which were recognizable as either stressful or non-stressful patterns. This determination was made according to the length, and to some degree, the shape of the pattern. However, very little effort was made to establish exact patterns or to provide a formula for determining deception, lending considerable confusion to the evaluation process and creating many errors.

Generally speaking, evaluated voice patterns come in all shapes and sizes. These patterns include variations of male, female, regional and international linguistic variations, etc. Regardless, human voice patterns share many characteristics and a similar stress-related trait, namely the tendency of a stress pattern to form a roughly rectangular pattern. This tendency is commonly know as "blocking."

Figure 1A:
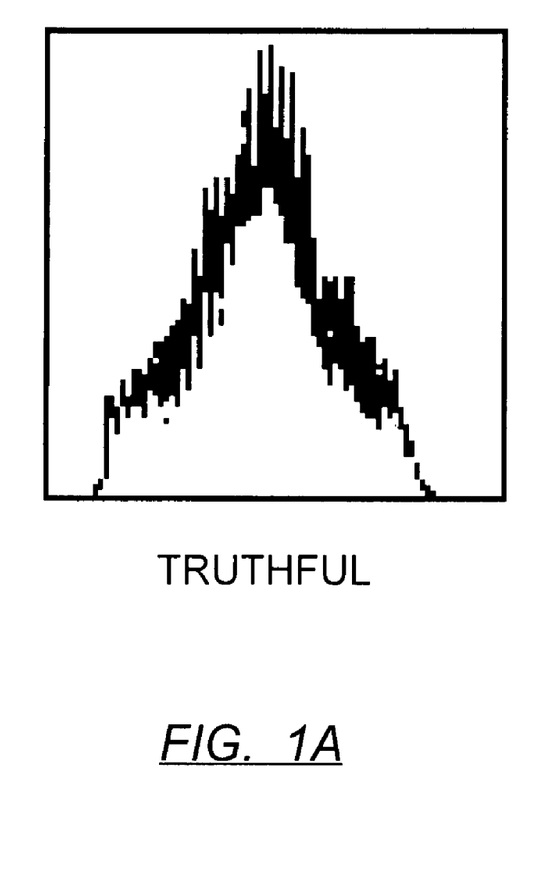
FIGS. 1A and 1B illustrate examples voice pattern samples.
Figure 1B:
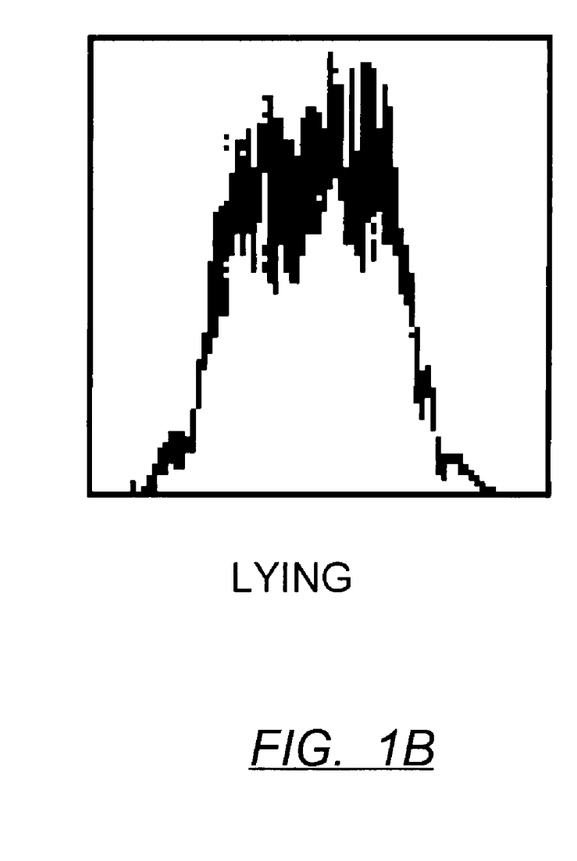

Referring now to FIG. 1A, a voice pattern is shown for a non-stressed, truthful vocal utterance, which, in this example, has a roughly triangular envelope. FIG. 1B shows the same utterance spoken as a non-truth, i.e. under psychological stress. It can be seen that the envelope of the pattern is approximately rectangular.

In prior art voice stress analysis systems, the determination of psychological stress is made empirically by a human examiner. A problem with the prior art systems is that since the judgment is made purely by visual observation, the personal bias of the examiner may enter into the scoring of the voice pattern. Also, since the results are based on individual human judgment, they can be influenced by, for example, the quality of training and the cumulative field experience of the individual examiner. This will naturally create inconsistencies in the scoring between individual examiners.

Thus, what is needed to solve the drawbacks of the prior art voice analysis systems is a computer-implemented scoring system which utilizes an algorithm to analyze the voice sample and generate a score. The computer-generated score can be used as a consistent guideline for the examiner as a means to provide non-biased, consistent scoring of psychological stress in a human subject.

SUMMARY OF THE INVENTION

It is an objective of the invention to provide a computer-implemented method of assigning a numeric score to a voice pattern sample of a human subject as an indicator of the stress level of the subject.

It is another objective to provide a computer-implemented algorithm which can quantify a voice pattern to generate a score.

It is still another objective to provide a computer-implemented algorithm which can quantify the degree of blocking present in a voice pattern sample.

It is a further objective of the invention to provide a computer-implemented method of assigning a numeric score to a voice pattern sample which can be used in the voice stress analysis examination process as a control value to ensure consistent results.

It is still a further objective of the invention to provide a computer-implemented method of assigning a numeric score to a voice pattern sample based on the degree of blocking pattern present in the sample.

It is yet a further objective of the invention to provide an algorithm which includes extensive filtering routines to refine the voice pattern so as to provide an accurate blocking score.

In light of the above, the applicants propose a computer-implemented method of assigning a numeric score to a voice pattern sample of a human subject wherein the score is indicative of the psychological stress level of the human subject, comprises the steps of converting the verbal utterance of a human subject into electrical signals plotted on a Cartesian coordinate system to provide a subject wave pattern having x and y axes; filtering the subject wave pattern to remove extraneous values at the leading and trailing edges of the wave pattern to provide a Relevant Pattern Location for analysis; providing a consecutive series of known voice pattern characteristics, wherein the consecutive series exhibits a sequential progression in the degree of blocking in the pattern; assigning a numerical value to each of the consecutive series of known voice pattern characteristics based on the degree of blocking in the pattern; analyzing the subject wave pattern within the Relevant Pattern Location to provide quantified data defining a set of characteristics for the subject wave pattern; providing quantified data defining a set of characteristics for the consecutive series of known voice pattern characteristics; comparing the quantified data of subject wave pattern to quantified data of each of the known voice pattern characteristics to ascertain a match between the subject wave pattern and one or more of the known voice pattern characteristics; and returning a numerical value for the refined wave pattern based on the one or more matching known voice pattern characteristics.

The method of the invention can further include the steps of forming a midpoint point array based on the midpoint amplitude of the waves in the subject wave pattern; detecting the largest segment of the midpoint array where y is approximately constant to provide an Isolated Pattern Location; enlarging the Isolated Pattern Location relevant to the x-axis to encompass approximately 50% of the Relevant Pattern Location; and analyzing the wave pattern within the Isolated Pattern Location to provide quantified data defining a set of characteristics for the wave pattern.

The quantified data includes, but is not limited to, frequency, wave amplitude, slope, the number of cycles in the Relevant Pattern Location, and the percentage of the area under the wave pattern within the Isolated Pattern Location relevant to a projected rectangular area having the minimal dimensions to encompass the Isolated Pattern Location.

Prior to scoring the voice pattern, the subject wave pattern is refined by applying a value-averaging algorithm to the y component of the subject wave pattern. The subject wave pattern is measured to determine if the subject wave pattern conforms to required characteristics for optimal analysis. If the width consists of more than 6000 points, an error message is returned. Initially, the wave pattern is filtered to remove the leading and trailing edges of the wave pattern where the value is 0.

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

The preferred embodiment of the present invention is implemented in a Computer Voice Stress Analyzer™ (CVSA) system in the form of software resident on a computer workstation. The computer workstation either includes or is in communication with a transducer means for converting audible sounds into electrical signals, and a means for converting the frequency modulations in the electrical signals to amplitude modulation to produce a visible pattern which can be displayed on a monitor or other suitable visual display means. The computer workstation can include a microphone for obtaining vocal recordings of the subject. Alternatively, the audible sounds to be analyzed can be stored on a recording medium readable through the computer workstation, and a monitor which displays the voice pattern to an operator. The muscular micro tremors associated with deceptive behavior are manifested in a voice pattern sample by a dampening of selected frequency variations, which, when graphically portrayed, result in a roughly rectangular pattern, referred to herein as pattern "blocking." An example of the blocking phenomena is shown in FIGS. 1A and 1B, which illustrate voice pattern samples for the spoken word "Yes" in a truthful context (FIG. 1A) and in a deceptive context (FIG. 1B). The voice pattern samples can be observed by an operator to make a visual determination as to the degree of blocking. For purposes of interpretations of psychological stress, voice pattern blocking can be categorized and scored as follows, with a higher score being indicative of probable deception. (The slopes are expressed as an angular measurement in degrees with reference to the horizontal y=0).

1. Hard block—score equals 90 to 99%, inclusive. Classification is primarily derived from one strong flat slope (defined as a slope>0° and ≦18.0°) that encompasses at least 95% of the total relevant pattern width. (Note: a perfectly horizontal voice 0.0° pattern is extremely unlikely, but not impossible to obtain.)
2. Medium block.—score equals 84 to 89%, inclusive. Classification is primarily derived from one moderately flat slope (defined as a slope>18.0° and ≦28.8°) that encompasses at least 50% of the total relevant pattern width.
3. Tendency to block.—score equals 80 to 83%, inclusive. Classification is primarily derived from one fairly flat slope (slope>28.8° and ≦36.0°) that encompasses at least 50% of the total relevant pattern width.
4. No blocking.—score equals 51 to 79%, inclusive. (Slope>36.0° and <90°). This is the default class. The classification remains "No Blocking" until the pattern is found to match one of the other classes. (Note: a perfectly vertical 90° voice pattern is impossible to obtain.)
5. Step blocking.—score equals 84 to 99%, inclusive. Classification is primarily derived from the relevant pattern with two immediately neighboring flat slopes (0-28.8°, inclusive) and separated by a brief and sharp incline or decline.

6. Split pattern—score equals 80 to 85%, inclusive. Classification is primarily derived from the relevant pattern with a slope moderately flat or more and approximately half the full relevant pattern width, and preceded or followed by a diagonal slope filling the other half of the relevant pattern width. This consists of a slope of 0-28.8°, inclusive, on one half of the pattern with the other half of the pattern having a slope $\geq 36.0°$ and $<90°$.

Obviously, it is necessary to provide a sufficient level of training to a human operator to enable the operator to properly "score" a visual representation of a spoken utterance. When an operator makes a purely empirical judgement, as in the prior art systems, it is inevitable that personal biases may enter into the scoring, and that the score may be influenced by the relative experience of the operator. The present invention provides a method whereby these inaccuracies can be corrected and guided by generating a computer-generated score. This provides a valuable non-biased second opinion, which is intended as a guideline for an examiner.

In order to generate a complete and accurate score, a computer algorithm is used to be able to identify the pattern's characteristics, nuances, and blocking trait. Nuances distort the voice pattern and affect the score, and some may be corrected programmatically. If the pattern is too distorted, it must be thrown out and retaken.

Figure 2:
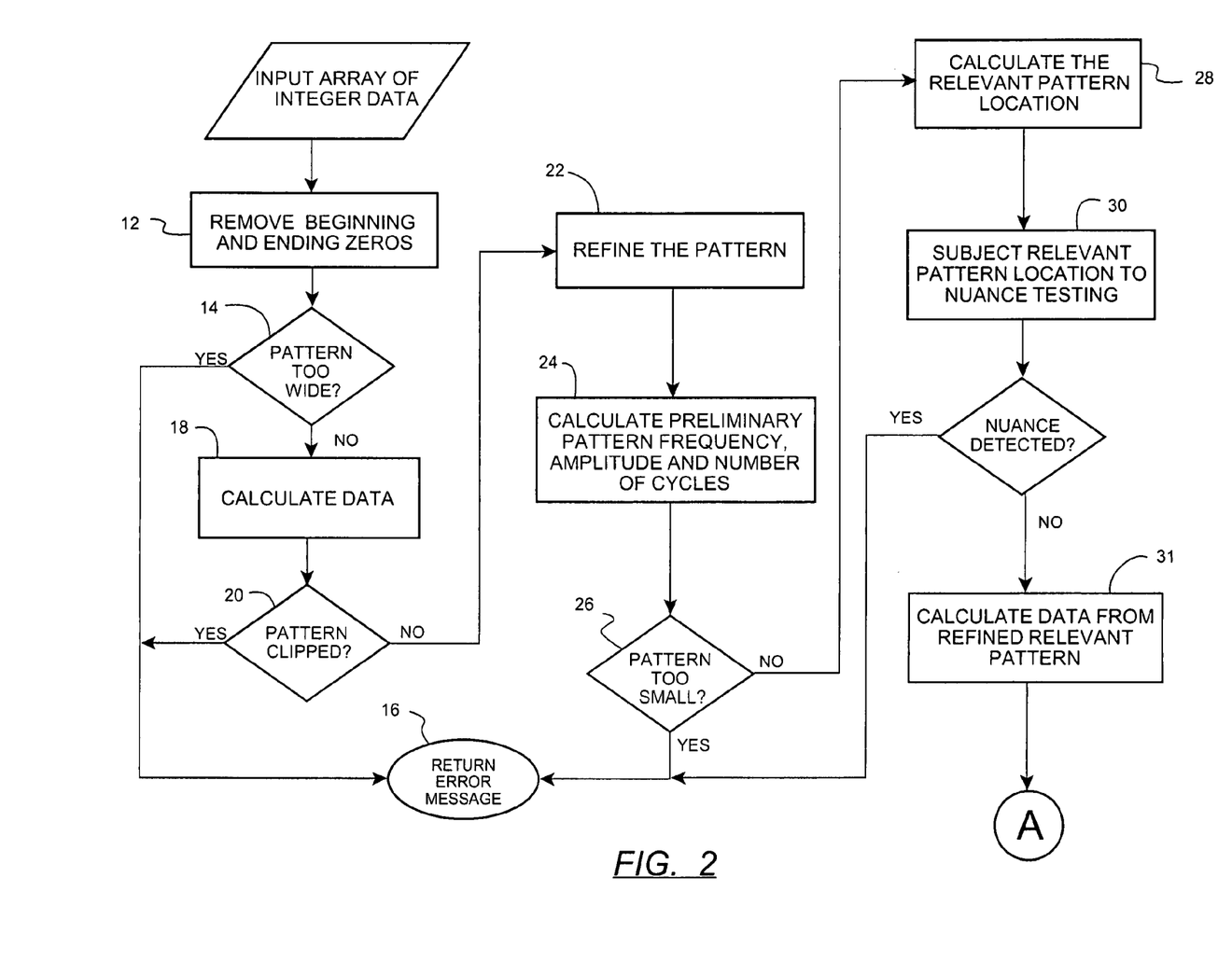
FIG. 2 illustrates the steps of the method of the invention for refining a voice pattern and verifying the pattern integrity according to a preferred embodiment of the present invention.

A voice pattern sample is initially saved as an array of integer data corresponding to a Cartesian (x,y) coordinate system. FIG. 2 illustrates the steps of the method of the invention which verify the pattern integrity. In step 12, the beginning and ending values where y=0 representing the leading and trailing edges of the wave are filtered out. The width of the pattern 14 is then determined relevant to the x axis. If the width is considered too wide, for example, greater than 6000 integers, an error message 16 is returned.

In step 18, Maximum and Minimum Point arrays are calculated, representing the upper and lower envelopes of the wave pattern. Based on these calculations, a determination 20 is made if the pattern is clipped, i.e. whether the first or last cycles create too steep an incline. If the pattern is clipped, an error message is returned. Using a value-averaging routine, the pattern is refined to remove minor scratchiness, wild cycles, minor gullying, cycle murmurs, etc. (step 22). Based on the refined pattern, the average frequency, average amplitude, and number of cycles is calculated (step 24.) If the number of cycles is too small, for example, less than 6, an error message is returned (step 26).

The Relevant Pattern Location is then calculated (step 28) by filtering out the beginning and ending irrelevant cycles. The Relevant Pattern Location is then subjected to extensive nuance testing 30. Nuances include, but are not limited to:
1. Excessive Pattern Width—pattern is too wide.
2. Insufficient Pattern—pattern has too few cycles.
3. Pattern Clipping—pattern has a 'cliff,' high vertical side or sides.
4. Precursor—a low amplitude grouping of cycles on the front of a pattern.
5. Postcursor—a low amplitude grouping of cycles on the end of a pattern.
6. Scratchiness—a pattern with no one identifiable frequency and amplitude.
 Due to:
  a) Too low of a volume—microphone volume is to low.
  b) Too high of a volume—microphone volume is to high.
  c) Overmodulation—caused by any other environmental or physical interference.
7. Wild Cycles—one or more cycles that spike and disrupt the pattern continuity.
8. Broken Patterns—more than one noticeable grouping of cycles within the pattern.
9. Cycle Compression—a group of cycles that have a noticeably smaller frequency and/or amplitude than the majority.
10. Minor Gullying—small burst of cycles that drop slightly for an instant, and then carry on at the identifiable pattern frequency and amplitude.
11. Static Electricity—small burst of cycles that drop significantly for an instant, and then carry on at the identifiable pattern frequency and amplitude.
12. Cycle Murmurs—when a set of cycles pause for small fraction of time, then continue at the identifiable pattern frequency and amplitude. The result is a cycle that is wider, near double, the identifiable frequency.

If the Relevant Pattern Location fails any of the above-listed nuance tests, an error message is returned.

The Relevant Pattern Location is then used to calculate the following (step 31):
1. Mid-Point Array—a string of numbers which represent the center of each half cycle. The numbers are Cartesian coordinates that map a line through the center of the pattern.
2. Frequency—average distance between individual cycles.
3. Amplitude—average height of individual cycles.
4. Number of cycles—count of full sound waves.
5. Number of top crests—count of major noticeable pattern peaks on the pattern's overall relevant top, formed from numerous cycles.
6. Number of bottom crests—count of major noticeable pattern peaks on the pattern's overall relevant bottom, formed from numerous cycles.
7. Percent of top flatness—percentage of relevant top that is flat compared to total relevant top.
8. Percent of bottom flatness—percentage of relevant bottom that is flat compared to total relevant bottom.

Figure 3:
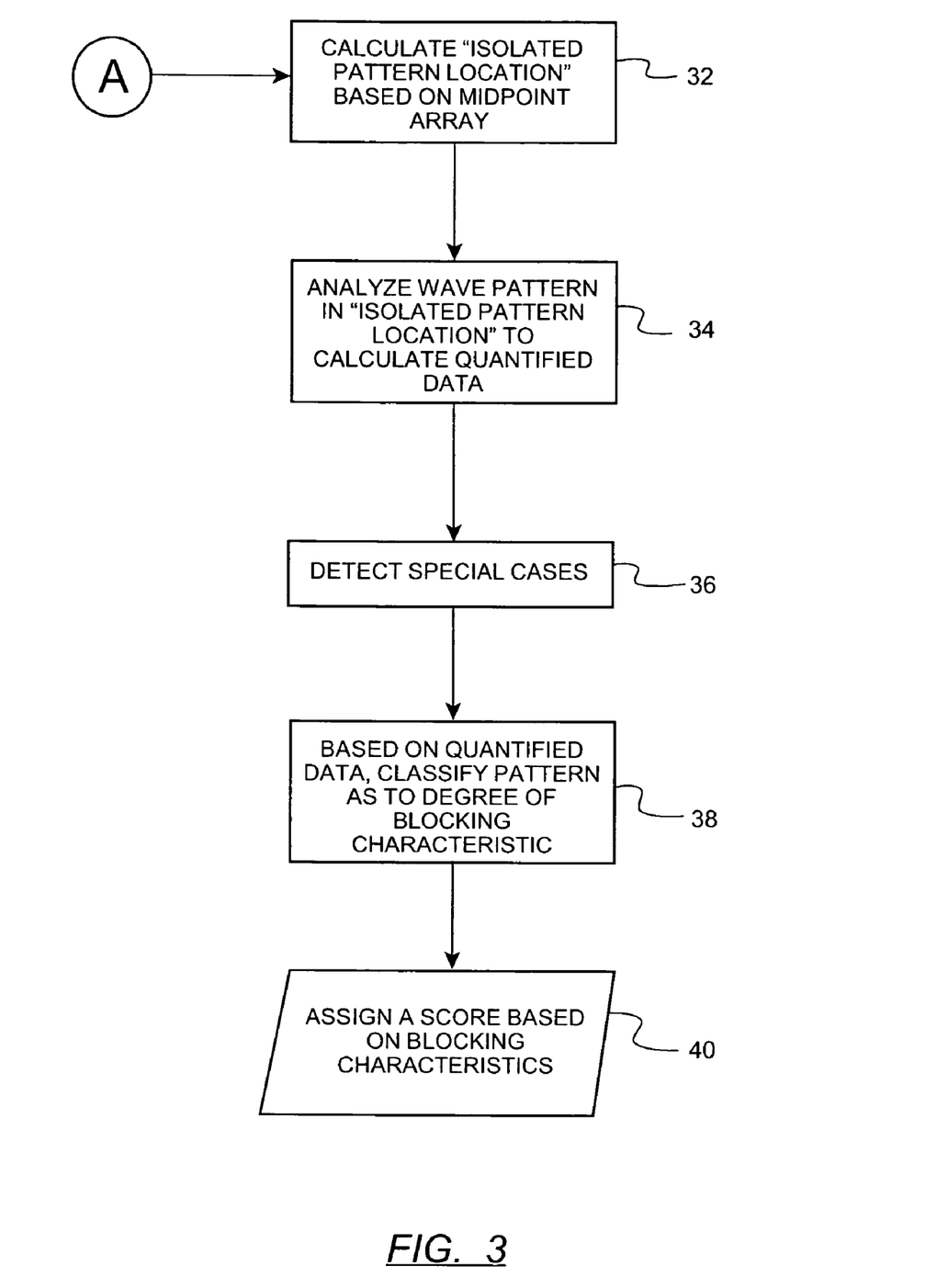
FIG. 3 illustrates the steps of the method of the invention for isolating the relevant portion of the pattern and generating a numerical score for the pattern.

FIG. 3 illustrates the steps for isolating and scoring the blocking pattern. In Step 32, the Isolated Pattern Location is calculated by detecting the largest segment of the Midpoint Array where y is approximately constant. This segment is enlarged relevant to the x-axis to encompass approximately 50% of the Relevant Pattern Location. The resulting portion of the Relevant Pattern Location is referred to as the Isolated Pattern Location. Using the Isolated Pattern Location, the following calculations are made (step 34):
1. Amplitude—average height of individual cycles.
2. Isolated Pattern Width Percent—percent of isolated pattern width compared to relevant pattern width.
3. Rectangular Area Filled—the measure of the isolated pattern's area within a projected rectangle having the minimal dimensions to encompass the Isolated Pattern Location.
4. Grade of top—measure of average incline on the pattern's isolated top.
5. Grade of bottom—measure of average incline on the pattern's isolated bottom.
6. Slope—measure of average incline of the isolated portion of the relevant pattern.

In step 36, "special cases" are detected using the data calculated from the Isolated Pattern Location. These "special cases" can mislead the scoring algorithm as to the amount of blocking present. Special cases include, but are not limited to, triangular patterns, arch shaped patterns, and low shoulder patterns. Minor special cases will limit the classification to "No Blocking," "Tendency to Block," and "Split Pattern." Major special cases will limit the classification only to "No Blocking."

In step 38, all of the quantified data which has been calculated is used to classify and score the blocking pattern into the categories listed above. This is based on a consecutive series of known voice pattern characteristics exhibiting a sequential progression in the degree of blocking in the pattern, i.e. hard blocking, medium blocking, tendency to block, etc. Each of the known voice pattern characteristics is assigned a scoring range, as detailed above. The parameters of the known voice pattern characteristics are compared to the quantified data to determine one or more matching known voice patterns. The score can then be iteratively calculated based on the degree of blocking. In step 40, a numerical score is returned. In the preferred embodiment of the invention, the numerical score is expressed as a number between 50 and 100, representing the percentage of blocking present. If an error message was returned at any point, a new voice sample is obtained, and the process is repeated. The algorithm also returns a message detailing any problems detected in the voice pattern sample. The score can then be used as a guideline by the examiner to either validate the examiner's judgement or cast doubt on the accuracy of the examiner's determination.

Figure 9A:
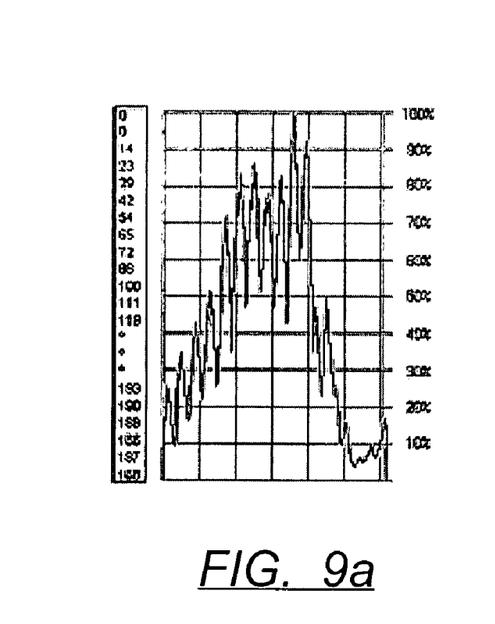
FIGS. 9a-f show the steps performed by the scoring algorithm to analyze an example voice pattern.

The following illustrates an example of the steps performed by the scoring algorithm to analyze a voice pattern and return a score. FIG. 9*a* is a voice pattern sample which has been mapped to a Cartesian coordinate system. The voice pattern shown in FIG. 9*a* consists of 2,306 data points from a list y integers.

Basic Data Scrutinizing:

1. Beginning and Ending Zeroes are removed. The list now has 2,304 integers (minus 2 zeros).

2. Test for excessive pattern width. The 2,304 integer list is within the 6000 integer limit.

Figure 10A:
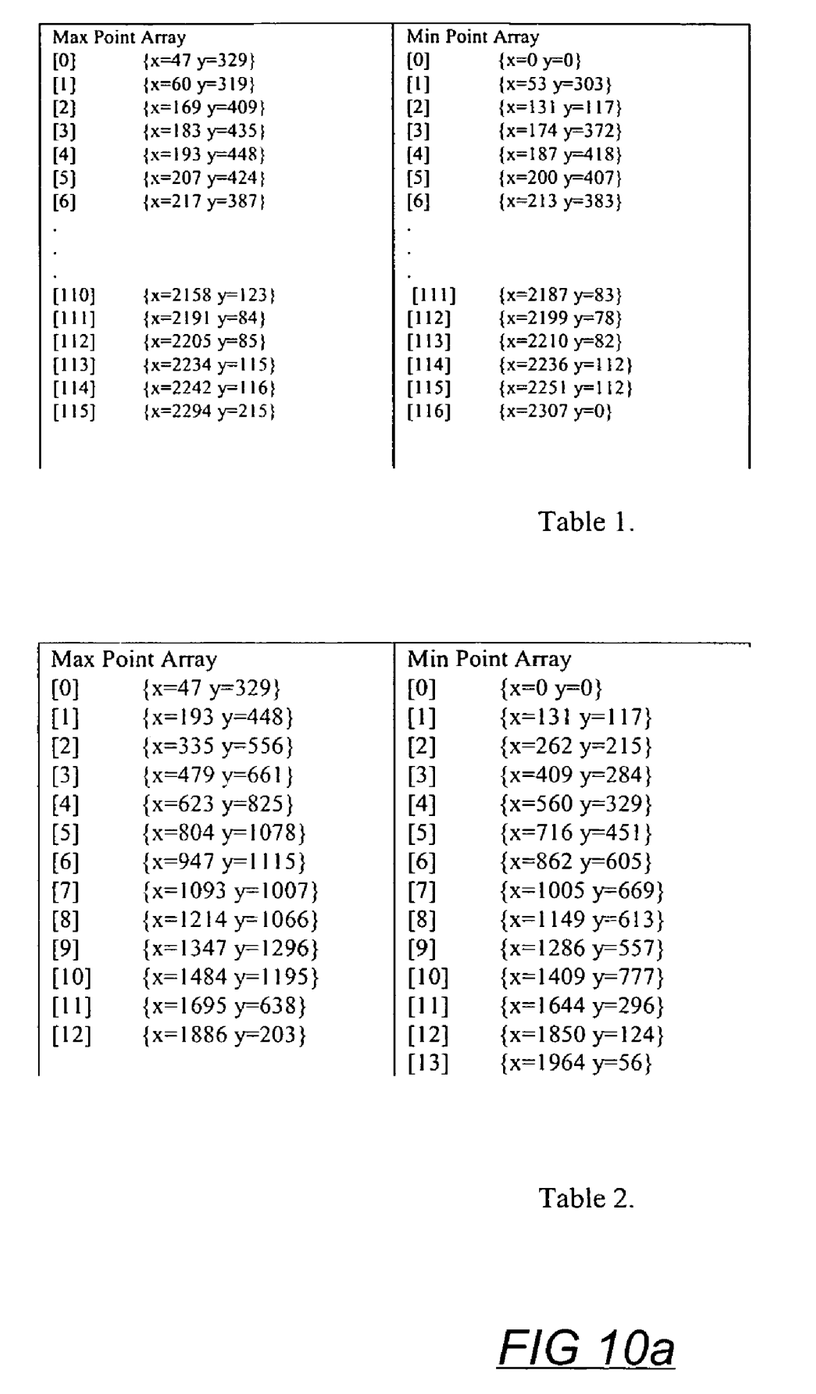
FIGS. 10a-b include data Tables 1-4 for the example pattern shown in FIG. 9a-f.

3. Calculate pattern characteristics of "Maximum Point Array," and "Minimum Point Array." Push the 2,304 integers through a routine that builds two (X,Y) arrays. Since the pattern data is unrefined, the Min and Max point arrays map every peak and base within the data, no matter how minute. The Min and Max arrays are not discernable from the basic pattern at this point. See Table 1 in FIG. 10*a*.

4. Check for pattern crippling. If the first Max point {x=47 y=329} or last Max point {x=2294 y=215} is higher than half the full pattern height, the pattern is clipped. This pattern is not clipped.

Figure 9B:
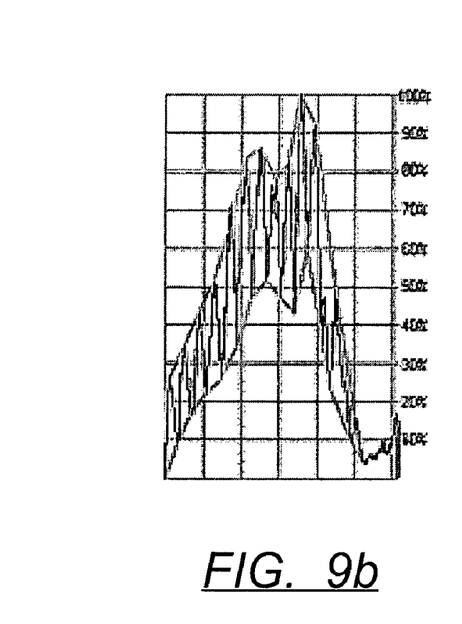

5. Refine the pattern. Remove points that are too close and do not fit the flow of the pattern. The pattern minimum and maximum arrays shown in FIG. 9*b* result. The lower right side of the pattern is not mapped because the cycles showed no consistency and lacked reasonable form. See Table 2 in FIG. 10*a*.

6. Calculate pattern frequency and amplitude. Average the distance between the X values of the Min point array to get the Frequency. Average the distance between the Y value of the Max point and the Y value of the Min point array to get the Amplitude.

7. Check for sufficient pattern width. The example pattern has 13 full cycles, determined by the length of the Max point array, which is greater than the required minimum of 6.

Figure 9C:
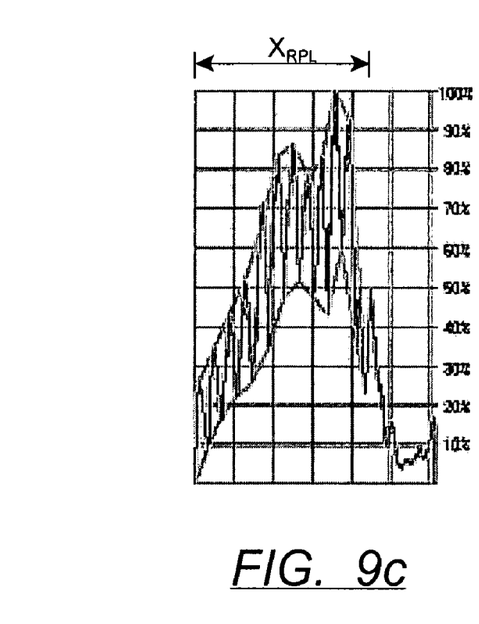
Figure 10B:
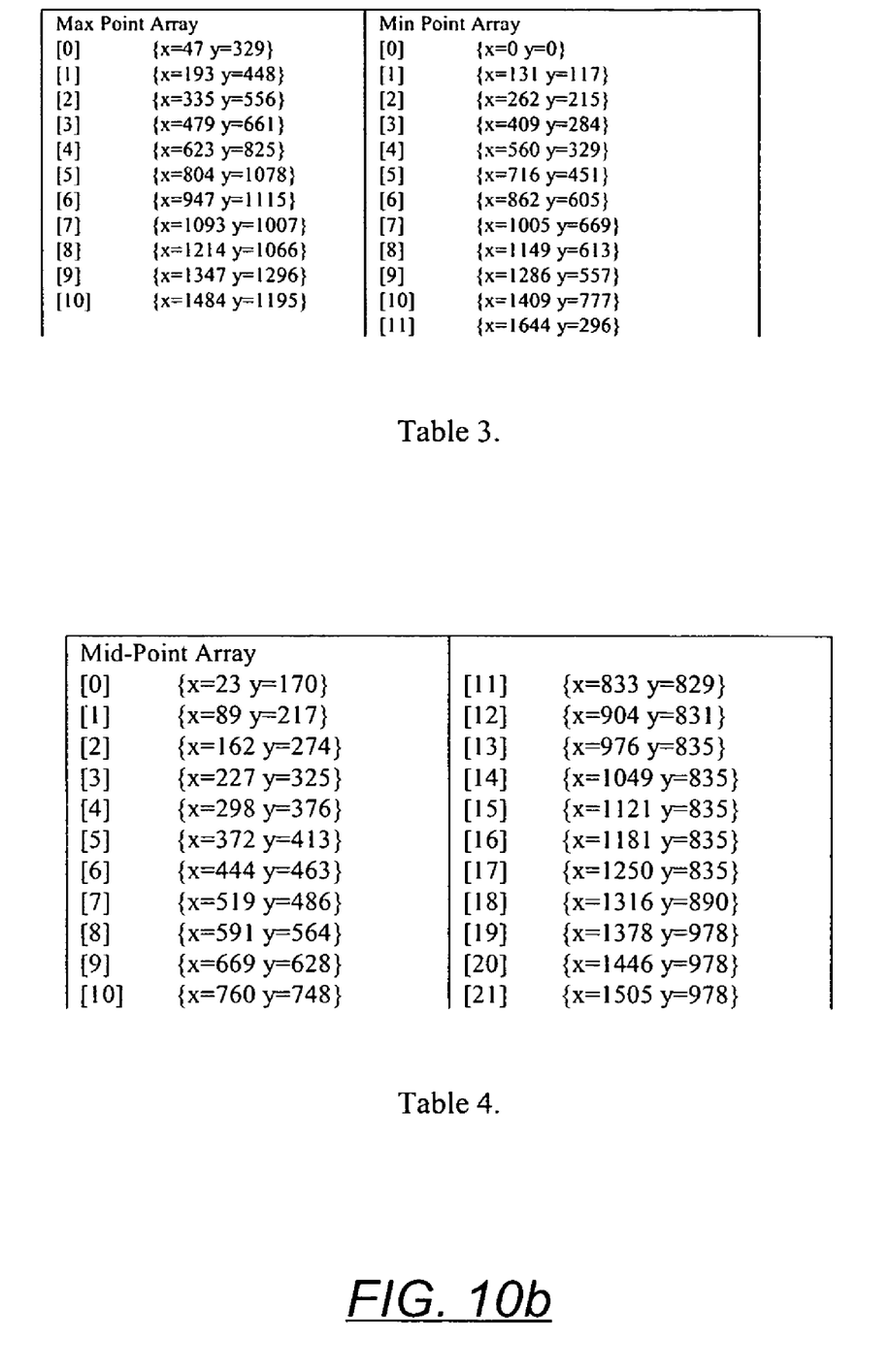

8. Determine Relevant Pattern Location. Remove beginning and ending irrelevant cycles. See Table 3 in FIG. 10*b*. The pre and post-cursor cycles are cycles that do not fit the general flow of the body and are located immediately to the left and to the right of the body, respectively. They generally are the cycles that precede or follow a sharp increase or decrease in the pattern structure. The example pattern shows no pre-cursor cycles, but exhibits a post-cursor cycle. FIG. 9*c* shows the Relevant Pattern Location $X_{RPL}$.

9. Perform nuance testing. If a value exceeds parameters, zero the pattern and return an error.
   a) Test for insufficient pattern again. The example pattern passes because it contains 6 or more cycles.
   b) Test for modulation problems. Sum all of the cycle amplitude differences and frequency differences. If this value is too great, there are modulation problems with the pattern. The example pattern does not exhibit this nuance.
   c) Test for wild cycles. The example pattern exhibits no cycle(s) that spike sharply up or down.
   d) Test for static electricity. There are no dramatic inconsistent drops in the example pattern.
   e) Test for cycle compression. The example pattern does not exhibit this. If cycle compression is present, calculate percent of composition to the whole of the relevant pattern location. This nuance becomes a problem at high levels.

Figure 9D:
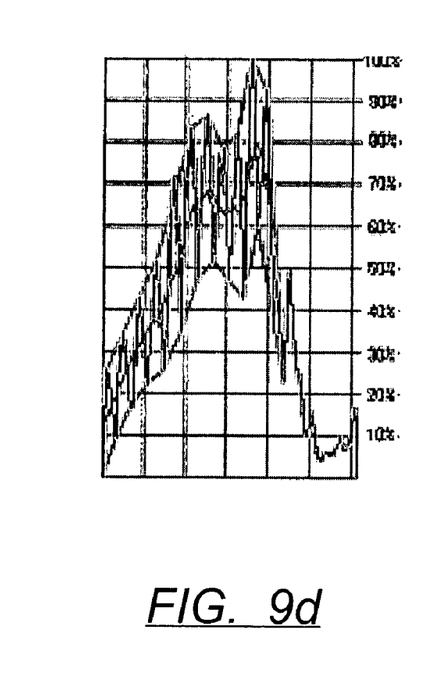
Figure 9E:
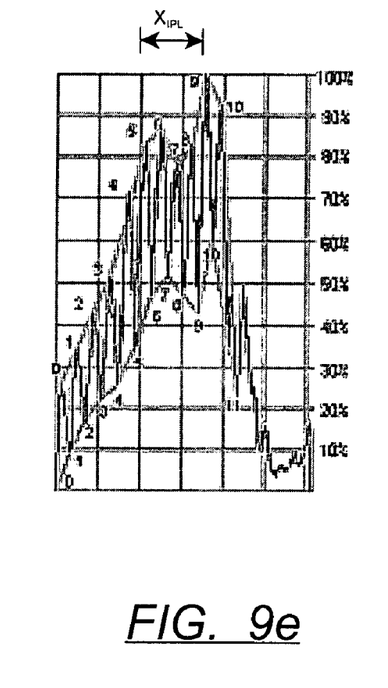

10. Calculate pattern characteristics.
   a) Mid-Point Array. Calculate center of each Max-Min Point. The example pattern has 11 cycles, with 22 Mid-Points. The Mid-point array is shown in FIG. 9*d*. See Table 4 in FIG. 10*b*.
   b) Frequency. Recalculated the approximate frequency within the "Relevant pattern location."
   c) Amplitude. Recalculate the approximate amplitude within the "Relevant pattern location."
   d) Count number of cycles within the "relevant pattern location." There are 11 full cycles in the example pattern.
   e) Calculate number of top crests of the Max Point Array. As shown in FIG. 9*e*, the Max Point Array has two major peaks, Max Points [6] and [9].
   f) Calculate number of bottom crests of the Min Point Array. As shown in FIG. 9*e*, the Min Point Array has two major peaks, Min Points [7] and [10].
   g) Percent of top flatness. Calculate percent of Max Points that hold a fairly constant horizontal level. The example pattern has 36% top flatness between Max Points [5] and [8]
   h) Percent of bottom flatness. The example pattern has 33% bottom flatness between Min Points [6] and [9].

Figure 9F:
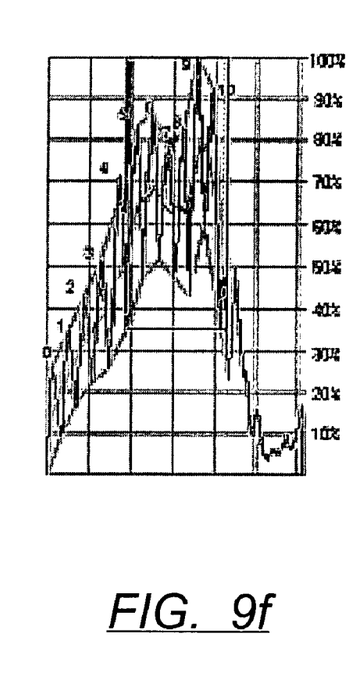

Advance Data Scrutinizing:

1. Calculate "Isolated Pattern Location."
   a) Locate the largest most level section within the "Relevant pattern location." Referring to FIG. 9*e*, this would be between cycles [5] and [9] labeled $X_{IPL}$.
   b) Enlarge the space to encompass at least 50% of the total "Relevant pattern location." This results in the area shown in FIG. 9*f* encompassing cycles [5] to [10].

2. Calculate pattern characteristics.
   a) Amplitude. Update the approximate amplitude within the "Isolated pattern location."
   b) Isolated Pattern Width Percent (of Relevant Pattern Location. This can equal from 49.5% to 100.0%. For the example pattern, it equals 50.0%.

c) Rectangular Area Filled. Percentage of area occupied by pattern within a rectangular area encompassing cycles within the "Isolated Pattern Location." The example pattern shows 68% of the area filled.
d) Grade of top. The average slope of the top within "Isolated Pattern Location" is 36°.
e) Grade of bottom. The average slope of bottom within "Isolated Pattern Location" is 57.6°.
f) Slope. The average slope of Mid-Point line within "Isolated Pattern Location" is 41.4°.

3. Detect for special cases. The slopes of the top and bottom within the "Isolated Pattern Location" are compared to a series of values that may match the pattern to one of the following cases. The example pattern failed to meet the criteria for each.
   a) Triangular Shape.
   b) Arch Shape.
   c) Low Shoulder.

4. Classify pattern. The example pattern is classified as "Tendency to Block."
   a) "No blocking." Every pattern starts in this class
   b) The pattern's characteristics are then compared to a matrix of values that it must equal or exceed, in order to be classified as "Tendency to Block." The example pattern passes this test.
   c) The pattern's characteristics are then compared to a matrix of values that it must equal or exceed, in order to be classified as "Medium Block." The example pattern failed this test.
   d) The pattern's characteristics are then compared to a matrix of values that it must equal or exceed, in order to be classified as a "Split Pattern." The example pattern failed this test.

5. Determine Score. The example pattern received an 80%.
   a) This pattern, by default, receives an 80% because it is classified as a "Tendency to Block."
   b) The example pattern was then compared to a matrix of values that it must equal or exceed in order to graduate to 81%.
   c) The example patttern failed to meet the criteria, so it remains 80%

6. Return the score and any other information in a "message." The algorithm returns a score of 80% with a message "Tendency to Block."

Figure 4:
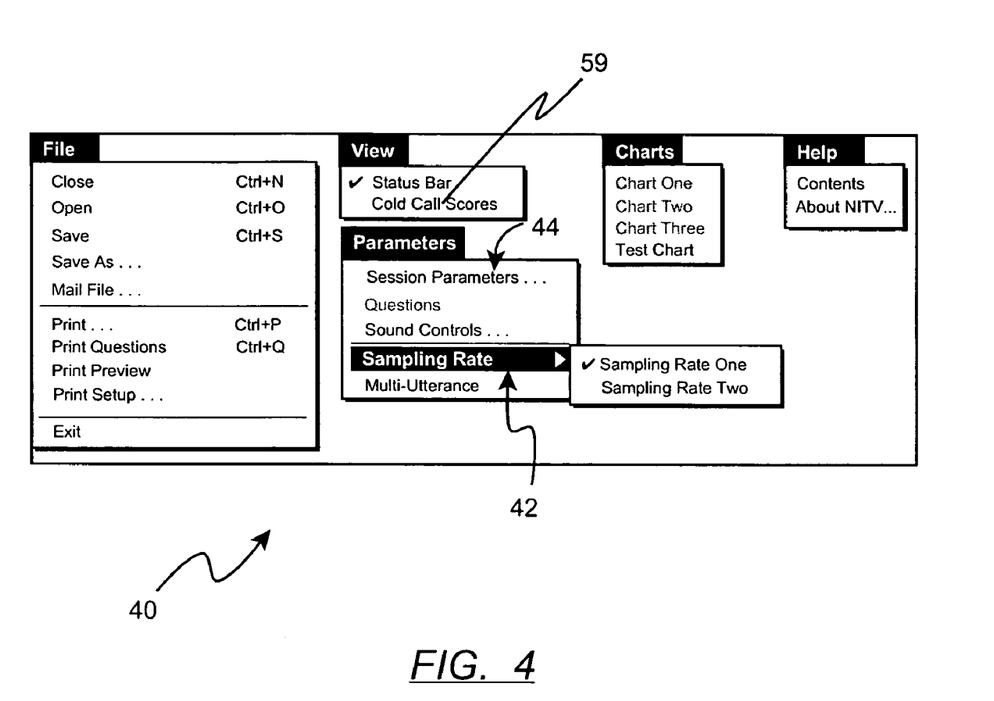
FIG. 4 illustrates an example of a menu used in a graphical user interface appearing on a computer monitor having the scoring algorithm resident thereon.

In the practice of the invention, the scoring algorithm is resident on a computer workstation which is used by an examiner to evaluate voice stress in a human subject. The scoring algorithm of the invention is preferably an integral subroutine of a computer program resident on the computer workstation which facilitates the voice stress evaluation. The examination process is guided by a graphical user interface displayed by the monitor which is viewed by the examiner during the session. As shown in FIG. 4, a menu 40 can be displayed to the examiner to allow the examiner to initiate the session and set parameters for the session. The examiner can select the sampling rate 42 to select the degree of compression in the pattern. In the example shown in the menu 40, the examiner can select between two different sampling rates.

Figure 5:
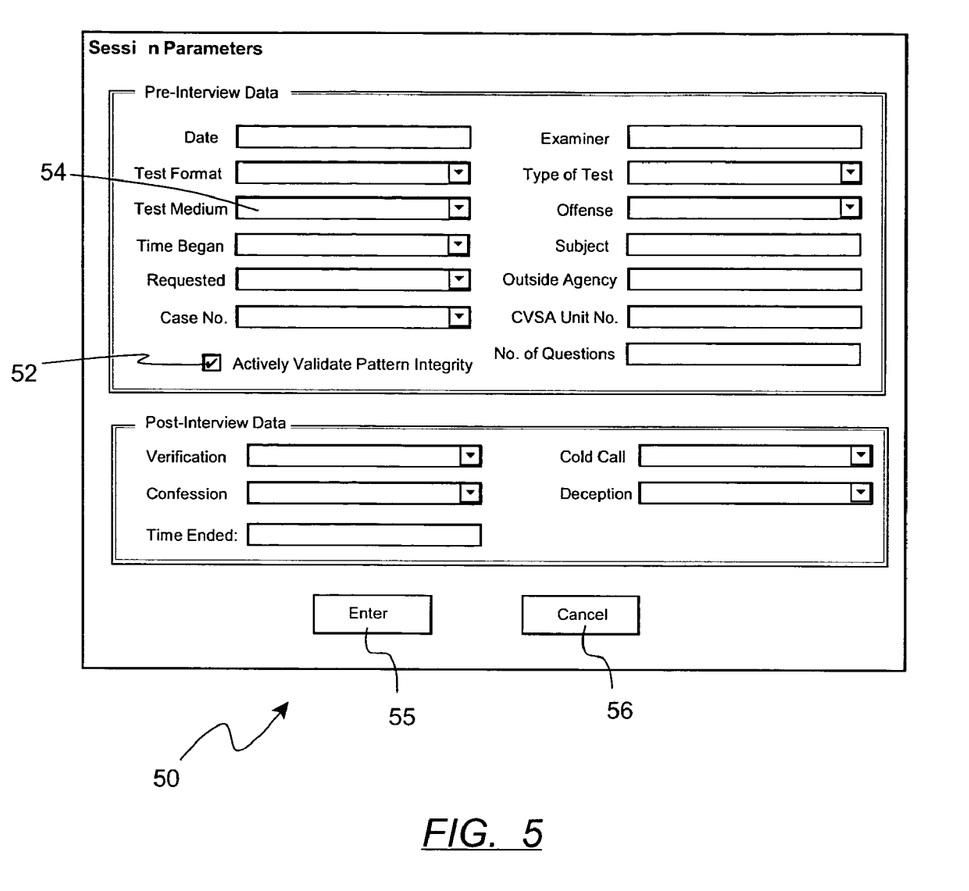
FIG. 5 illustrates the Session Parameters dialog box.
Figure 6:
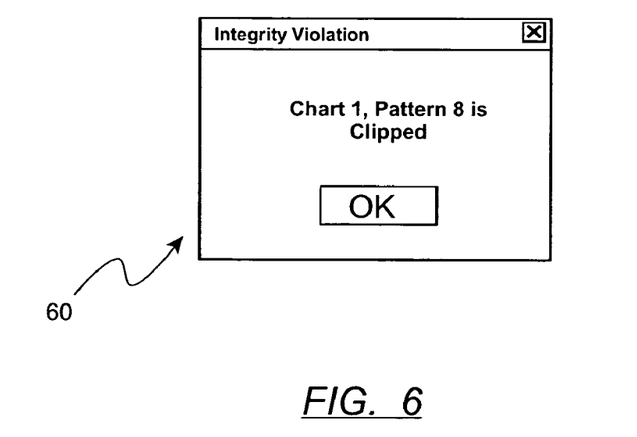
FIG. 6 illustrations a pop-up window displaying an error message.

Selection of the Sessions Parameters menu choice 44 displays the Session Parameters dialog box 50 shown in FIG. 5. The Sessions Parameters dialog box 50 prompts the examiner to enter text information relevant to the session. The selection check box 52 allows the examiner to selectively activate an automatic validation of pattern integrity. As shown in FIG. 6, when this feature is activated, an error message returned by the scoring algorithm results in a "pop-up window" display such as the dialog box 60.

The test format field 53 determines the type of questions used in the examination. In a preferred embodiment, the formats are preset for the type of examination, e.g. pre-employment, law enforcement applications, etc. The test medium field 54 determines how the recording is activated and deactivated. The options are "manual" and "voice activated." With "manual" the recording can be activated by an action of the examiner, such as depressing a key on the keyboard. Selecting the "enter" button 55 saves the fields to memory. Selecting the "cancel" button 56 does not save the fields to memory but maintains previously entered data.

Figure 7:
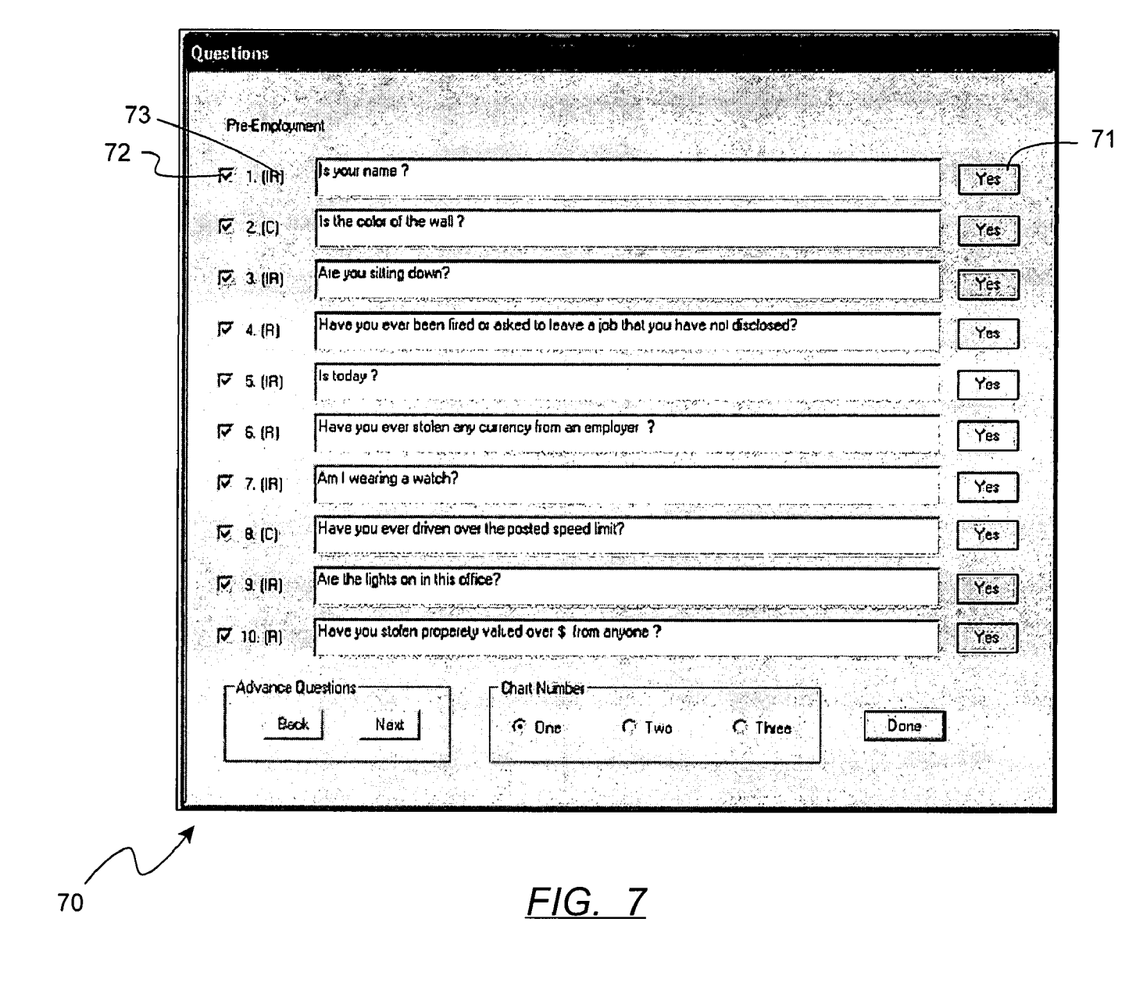
FIG. 7 illustrates the questions dialog box.

FIG. 7 illustrates the Questions dialog box 70 which is displayed to the examiner during the session. The questions are preferably editable fields, and can be predefined by default questions depending on the selection in the "Test Format" field in the Sessions Parameters dialog box (FIG. 5). The buttons 71 to the right of the questions defines the expected answer to the question. (In the illustrated example, the answers are "yes" or "no.") The check boxes 72 to the left of the question allows the examiner to selective which questions are to be active during the examination. The number and type of questions 73 is displayed to the left of the question. In the illustrated example, there are three types of questions: Control (C), Relevant (R), and Irrelevant (R). In the preferred embodiment, the number and type is a fixed field determined by the "Test Format" selection in the Sessions Parameters dialog box which cannot be modified.

Figure 8:
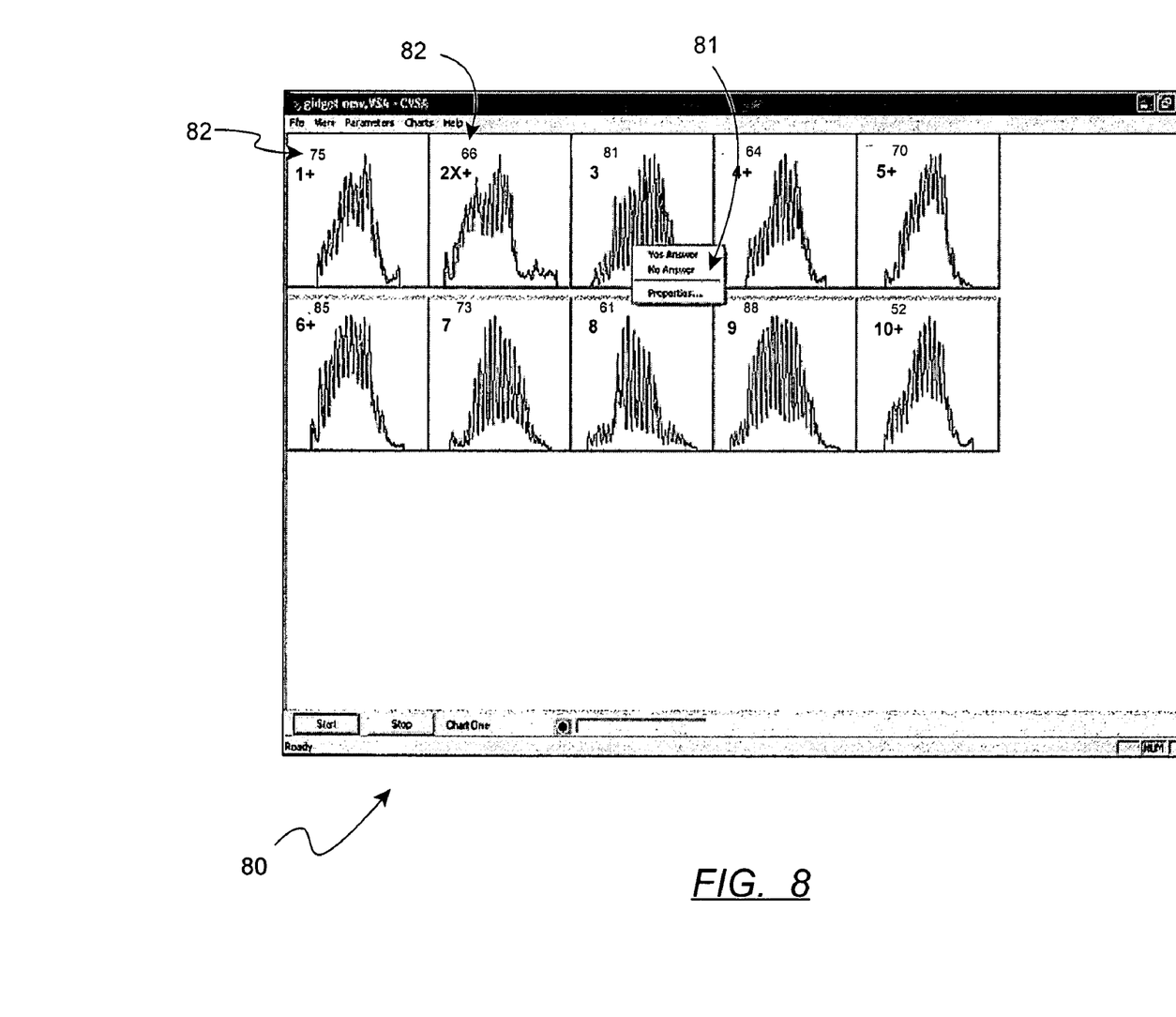
FIG. 8 illustrates the voice pattern chart dialog box displaying scores generated by the scoring algorithm.

FIG. 8 illustrates the voice pattern chart dialog box 80 which is displayed to the examiner. After the examination is complete, the ten voice stress patterns corresponding to the ten sessions questions are displayed simultaneously. Using the pop-up dialog box 81 (activated by a mouse button or other pointing device) the examiner can mark the pattern as either "yes" or "no" to display "+" or "−" respectively with the pattern.

The score generated by the scoring algorithm can be displayed in association with each pattern. In the illustrated example, the generated score 82 appears in the upper left hand corner of each pattern. When the "Cold Call Scores" option 59 shown in FIG. 4 is enabled, the scores are automatically generated and displayed. Alternatively, the "Cold Call Scores" option can be disabled, or toggled on and off at will by the examiner. The "Cold Call Scores" option is disabled until the end of the session. The examiner can then use the generated score in combination with the examiner's empirical judgement regarding the test results to arrive at a determination of the veracity of the subject with more accurate results.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

I claim:

1. A computer-implemented method of assigning a numeric score to a voice pattern sample of a human subject wherein the score is indicative of the psychological stress level of the human subject, comprising the steps of:
   converting the verbal utterance of a human subject into electrical signals plotted on a Cartesian coordinate system to provide a subject wave pattern having x and y axes;

filtering the subject wave pattern to remove extraneous values at the leading and trailing edges of the wave pattern to provide a Relevant Pattern Location for analysis;

providing a consecutive series of known voice pattern characteristics, wherein the consecutive series exhibits a sequential progression in the degree of blocking in the pattern;

assigning a numerical value range to each of the consecutive series of known voice pattern characteristics based on the degree of blocking in the pattern;

analyzing the subject wave pattern within the Relevant Pattern Location to provide quantified data defining a set of characteristics for the subject wave pattern;

providing quantified data defining a set of characteristics for the consecutive series of known voice pattern characteristics; and comparing the quantified data of subject wave pattern within the Relevant Pattern Location to quantified data for each of the known voice pattern characteristics to ascertain a match between the subject wave pattern and one or more of the known voice pattern characteristics; and returning a numerical value for the subject wave pattern based on the one or more matching known voice pattern characteristics.

2. The method of claim 1, further comprising the step of: applying a value-averaging algorithm to the y component of the subject wave pattern to refine the subject wave pattern.

3. The method of claim 1, further comprising the step of measuring the subject wave pattern to determine if the subject wave pattern conforms to required characteristics for optimal analysis.

4. The method of claim 3, wherein the step of measuring the subject wave pattern further comprises determining the width of the pattern relevant to the x-axis.

5. The method of claim 4, further comprising the step of returning an error message if the width of the pattern is greater than 6000 integers.

6. The method of claim 1, wherein the quantified data for the subject wave pattern and the known voice pattern characteristics includes the wave frequency.

7. The method of claim 1, wherein the quantified data for the subject wave pattern and the known voice pattern characteristics includes the wave amplitude.

8. The method of claim 1, wherein the quantified data for the subject wave pattern and the known voice pattern characteristics includes the number of cycles in refined subject wave pattern.

9. The method of claim 8, further comprising the step of returning an error message if the number of cycles is less than 6 cycles.

10. The method of claim 1, further comprising the steps of: filtering the subject wave pattern to remove values at the leading edge of the wave pattern where y=0; and
   filtering the subject wave pattern to remove values at the trailing edge of the wave pattern where y=0.

11. The method of claim 1, wherein the step of analyzing the subject wave pattern further includes the step of forming an maximum point array based on the peak of each cycle in the subject wave pattern.

12. The method of claim 1, wherein the step of analyzing the subject wave pattern further includes the step of forming an minimum point array based on the base of each cycle in the subject wave pattern.

13. The method of claim 1, wherein the step of analyzing the subject wave pattern further includes forming an midpoint point array based on the midpoint between each maximum point and minimum point in the subject wave pattern.

14. A computer-implemented method of assigning a numeric score to a voice pattern sample of a human subject wherein the score is indicative of the psychological stress level of the human subject, comprising the steps of:
   converting the verbal utterance of a human subject into electrical signals plotted on a Cartesian coordinate system to provide a subject wave pattern;
   measuring the subject wave pattern to determine if the subject wave pattern conforms to required characteristics for optimal analysis;
   filtering the subject wave pattern to remove extraneous values at the leading and trailing edges the wave pattern to provide a Relevant Pattern Location for analysis;
   forming a midpoint point array based on the midpoint of each half cycle in the subject wave pattern;
   detecting the largest segment of the midpoint array where y is approximately constant to provide an Isolated Pattern Location;
   enlarging the Isolated Pattern Location relevant to the x-axis to encompass approximately 50% of the Relevant Pattern Location;
   analyzing the wave pattern within the Isolated Pattern Location to provide quantified data defining a set of characteristics for the wave pattern;
   providing a consecutive series of known voice pattern characteristics, wherein the consecutive series exhibits a sequential progression in the degree of blocking in the pattern;
   assigning a numerical value range to each of the consecutive series of known voice pattern characteristics based on the degree of blocking in the pattern;
   comparing the quantified data for the wave pattern within the Isolated Pattern Location to the parameters of known voice pattern characteristics to ascertain a match between wave pattern in the Isolated Pattern Location and one or more of the known voice pattern characteristics; and
   returning a numerical value for the Isolated Pattern Location based on the matching of parameters with known voice pattern characteristics.

15. The method of claim 14, further comprising the step of applying a value-averaging algorithm to the y-component of the subject wave pattern within the refined subject wave pattern.

16. The method of claim 14, wherein the step of analyzing the wave pattern within the Isolated Pattern Location further includes calculating the amplitude of the wave pattern.

17. The method of claim 14, wherein the step of analyzing the wave pattern within the Isolated Pattern Location further includes calculating the percentage of the Isolated Pattern Location relevant to the Relevant Pattern Location.

18. The method of claim 14, wherein the step of analyzing the wave pattern within the Isolated Pattern Location further includes calculating the slope of the wave pattern.

19. The method of claim 14, wherein the step of quantifying the wave pattern within the Isolated Pattern Location further includes calculating the percentage of the area under the wave pattern within the Isolated Pattern Location relevant to a projected rectangular area having the minimal dimensions to encompass the Isolated Pattern Location.

* * * * *